US011454281B2

(12) United States Patent
Nimura et al.

(10) Patent No.: US 11,454,281 B2
(45) Date of Patent: Sep. 27, 2022

(54) SLIDING MEMBER

(71) Applicant: DAIDO METAL COMPANY LTD., Nagoya (JP)

(72) Inventors: Kenji Nimura, Inuyama (JP); Erina Yasuda, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 52 days.

(21) Appl. No.: 16/767,309

(22) PCT Filed: Dec. 25, 2018

(86) PCT No.: PCT/JP2018/047691
§ 371 (c)(1),
(2) Date: May 27, 2020

(87) PCT Pub. No.: WO2019/181131
PCT Pub. Date: Sep. 26, 2019

(65) Prior Publication Data
US 2020/0408258 A1    Dec. 31, 2020

(30) Foreign Application Priority Data
Mar. 22, 2018   (JP) .............................. JP2018-055377

(51) Int. Cl.
*C10M 103/00*   (2006.01)
*F16C 33/10*   (2006.01)
(Continued)

(52) U.S. Cl.
CPC ....... *F16C 33/1095* (2013.01); *C10M 103/02* (2013.01); *C10M 103/06* (2013.01);
(Continued)

(58) Field of Classification Search
CPC .. F16C 33/1095; F16C 33/20; F16C 2240/54; F16C 2202/52; F16C 2240/64;
(Continued)

(56) References Cited

U.S. PATENT DOCUMENTS

2014/0037236 A1\* 2/2014 Kobayakawa ........ F16C 33/206
384/397

FOREIGN PATENT DOCUMENTS

DE   102013227186 A1   7/2015
JP   10-2335 A   1/1998
(Continued)

OTHER PUBLICATIONS

International Search Report issued in corresponding International Application No. PCT/JP2018/04691 dated Apr. 2, 2019.

*Primary Examiner* — Taiwo Oladapo
(74) *Attorney, Agent, or Firm* — Snyder, Clark, Lesch & Chung, LLP

(57)   ABSTRACT

Disclosed herein is a sliding member for an internal-combustion engine of an automobile or the like. The sliding member has excellent sliding properties due to high oleophilicity of its sliding surface achieved by adjusting the surface texture of a resin layer forming the sliding surface, which makes it possible to effectively prevent wear or seizure of the sliding member and a counterpart sliding member thereof. The sliding member includes a resin layer provided on a surface of a base material, in which the resin layer has a surface roughness of 1.05 or more, preferably 1.07 or more. The mean spacing (s) between local peaks of the resin layer may be in the range of 2 μm or more but 12 μm or less, but may be preferably in the range of 2 μm or more but 10 μm or less. Further, the mean height (Rc) of the
(Continued)

resin layer may be in the range of 0.5 μm or more but 5.0 μm or less, but may be preferably in the range of 0.5 μm or more but 3.0 μm or less.

9 Claims, 4 Drawing Sheets

(51) Int. Cl.
    *C10M 103/02*     (2006.01)
    *C10M 103/06*     (2006.01)
    *C10M 107/38*     (2006.01)
    *F16C 33/20*     (2006.01)
    *C10N 50/08*     (2006.01)

(52) U.S. Cl.
    CPC ........... *C10M 107/38* (2013.01); *F16C 33/20* (2013.01); *C10N 2050/08* (2013.01)

(58) Field of Classification Search
    CPC ..... F16C 33/205; F16C 33/10; C10M 103/02; C10M 103/06; C10M 107/38; C10M 125/00; C10M 2213/062; C10M 2201/066; C10M 2201/065; C10M 2201/062; C10M 2201/041; C10M 2201/061; C10M 103/00; C10N 2050/08; C10N 2050/025; C10N 2020/06

See application file for complete search history.

(56) References Cited

FOREIGN PATENT DOCUMENTS

| | | |
|---|---|---|
| JP | 2007-255312 A | 10/2007 |
| JP | 2009-220103 A | 10/2009 |
| JP | 2010-151029 A | 7/2010 |
| JP | 2010-162528 A | 7/2010 |
| JP | 2012-167809 A | 9/2012 |
| JP | 2013-36339 A | 2/2013 |
| JP | 2014-1808 A | 1/2014 |
| JP | 2015-183799 A | 10/2015 |
| KR | 10-2003-0001500 A | 1/2003 |

* cited by examiner (A)

(B)

(A)

(B)

(A)

(B)

SLIDING MEMBER

TECHNICAL FIELD

The present invention relates to a sliding member, and more specifically relates to a sliding member having a resin layer forming a sliding surface.

BACKGROUND ART

The sliding surface of a slide bearing applied to an internal-combustion engine of an automobile or the like is required to have high wear resistance or high seizure resistance. To meet such a requirement, a resin layer having lubricity is conventionally provided on the inner periphery of a bearing, or a space, such as an oil groove, is conventionally provided in the sliding surface of a bearing to retain a lubricant oil between a shaft and the bearing during the rotation of the shaft.

Patent Document 1 (JP 2015-183799 A) describes a bearing including: a cylindrical base material having an inner periphery; an oleophobic first resin layer provided on the inner periphery of the cylindrical base material; and an oleophilic second resin layer provided on the inner periphery of the cylindrical base material and made of a material having an elastic modulus smaller than that of the first resin layer, in which the second resin layer is more recessed than the first resin layer in a state where a surface pressure is applied to the first resin layer and the second resin layer so that grooves are formed in a sliding surface (see claim 1, paragraph [0026] of the description, and FIG. 4 of Patent Document 1). The technique described in Patent Document 1 is intended to prevent wear or seizure of a shaft and a bearing by providing a structure in which when the shaft is rotated to increase the pressure of an oil film, a lubricant oil is likely to be retained in the grooves formed by the oleophilic second resin layer, and when the shaft is not rotated, the lubricant oil is likely to be discharged also to a first contact surface of the oleophobic first resin layer.

CITATIONS LIST

Patent Documents

Patent Document 1: JP 2015-183799 A

SUMMARY OF INVENTION

Technical Problems

The technique described in Patent Document 1 is intended to be applied to a bearing in which the pressure of an oil film is 6 MPa (megapascal), and specific examples of such a bearing include those in compressors using a cooling medium, particularly scroll-type compressors and swash plate-type compressors (see paragraph [0029] of the description in Patent Document 1). Therefore, if the technique described in Patent Document 1 is applied to a slide bearing of an internal-combustion engine of an automobile or the like, there is a fear that a shortage of supply of a lubricant oil to the first contact surface of the highly oleophobic first resin layer is caused due to a high surface pressure (about 10 to 20 MPa) generated in the actual use of the slide bearing in the internal-combustion engine, and as a result, an oil film between a shaft and the bearing is broken so that wear or seizure of the shaft and the bearing occurs.

In order to solve the above problem, the present invention was made. Therefore, it is an object of the present invention to provide a sliding member having excellent sliding properties for use in the internal-combustion engine of an automobile or the like. More specifically, the surface texture of the resin layer forming the sliding surface of the sliding member is adjusted to enhance the oleophilicity of the sliding surface, that is, the wettability of the sliding surface with a lubricant oil. This makes it easy to spread a lubricant oil over the entire sliding surface, thereby preventing the breakage of the spreaded lubricant oil, and thus it is enabled to effectively prevent the wear or seizure of the sliding member and a counterpart sliding member thereof. That is, it is possible to provide a sliding member having excellent sliding properties.

In order to achieve the above object, the present inventors have intensively studied, and as a result have conceived the following aspects of the present invention.

A sliding member according to a first aspect of the present invention comprises a resin layer provided on a surface of a base material, in which the resin layer has a surface roughness of 1.05 or more.

Such a structure makes it possible to improve the wettability of the sliding surface with a lubricant oil, thereby improving the sliding properties of the sliding surface.

A sliding member according to a second aspect of the present invention is the sliding member described above, in which the resin layer has a surface roughness of 1.07 or more. This makes it possible to further improve the sliding properties of the sliding surface.

A sliding member according to a third aspect of the present invention is the sliding member defined in the first or second aspect, in which a mean spacing (s) between local peaks of the resin layer is in a range of 2 μm or more but 12 μm or less.

Such a structure contributes to improvement in the wettability of the sliding surface with a lubricant oil, that is, improvement in the sliding properties of the sliding surface.

A sliding member according to a fourth aspect of the present invention is the sliding member defined in the first or second aspect, in which a mean height (Rc) of the resin layer is in a range of 0.5 μm or more but 5.0 μm or less. Such a structure also contributes to improvement in the wettability of the sliding surface with a lubricant oil, that is, improvement in the sliding properties of the sliding surface.

It is to be noted that according to an aspect (fifth aspect) in which the respective requirements of both the third and fourth aspects are satisfied, that is, a mean spacing (s) between local peaks of the resin layer is in a range of 2 μm or more but 12 μm or less, and a mean height (Rc) of the resin layer is in a range of 0.5 μm or more but 5.0 μm or less, the wettability of the sliding surface with a lubricant oil is further improved, and therefore the sliding surface can surely have more excellent sliding properties.

A sixth aspect of the present invention is defined as follows. That is, a sliding member according to the sixth aspect of the present invention is the sliding member defined in the fifth aspect, in which a mean spacing (s) between local peaks of the resin layer is 2 μm or more but 10 μm or less, and a mean height (Rc) of the resin layer is 0.5 μm or more but 3.0 μm or less.

As compared with the sliding member defined in the fifth aspect, the sliding member according to the sixth aspect defined above makes it possible to further improve the wettability of the sliding surface with a lubricant oil, thereby further improving the sliding properties of the sliding surface.

A sliding member according to a seventh aspect of the present invention is the sliding member described above, in which the resin layer contains a high heat-resistant first solid lubricant and a high lubricative second solid lubricant, and a volume ratio of the first solid lubricant to the second solid lubricant is in a range of 0.1 or more but 4.0 or less.

Because of having such a structure, the high heat-resistant first solid lubricant keeps excellent lubricity between the sliding member and a counterpart sliding member thereof even in a high-temperature environment created by friction, and the high lubricative second solid lubricant reduces friction between the sliding member and the counterpart sliding member to prevent a temperature rise caused by friction. This makes it possible to effectively prevent wear or seizure. That is, the sliding properties are improved.

A sliding member according to an eighth aspect of the present invention is the sliding member described in the seventh aspect, in which a volume ratio of the first solid lubricant to the second solid lubricant is in a range of 0.5 or more but 2.6 or less. This makes it possible to further improve the sliding properties of the sliding surface.

A sliding member according to a ninth aspect of the present invention is the sliding member described above, in which the second solid lubricant contains at least one of molybdenum disulfide, tungsten disulfide, and polytetrafluoroethylene (PTFE).

A sliding member according to a tenth aspect of the present invention is the sliding member described above, in which the first solid lubricant contains at least one of graphite, h-boron nitride (h-BN), and molybdenum trioxide.

Such structures make it possible to appropriately exert the above-described effects.

DESCRIPTION OF EMBODIMENTS

Hereinbelow, a sliding member 1 according to an embodiment of the present invention will be described with reference to the accompanying drawings. As the sliding member 1, a slide bearing for use in, for example, an internal-combustion engine of an automobile or the like can be exemplified.

FIG. 1(A) is a schematic view showing the cross-section of an area near a sliding surface 21 of the sliding member 1 according to the embodiment of the present invention. The sliding member 1 has a structure in which a resin layer 20 made of a sliding resin composition is laminated on the sliding surface 21-side surface of a base material layer 10.

Figure 1:
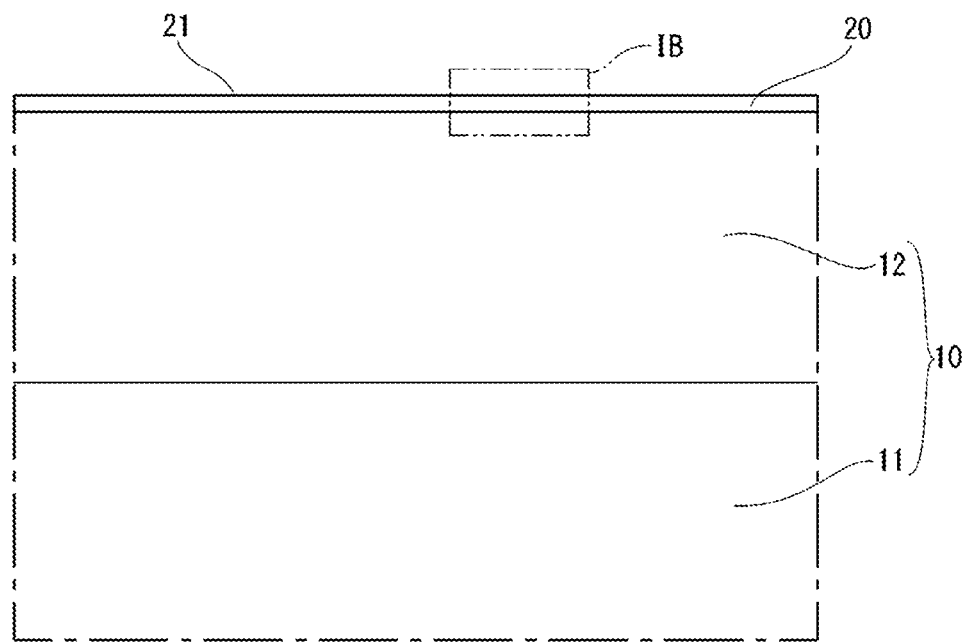
FIG. 1 is a schematic view showing a part of the cross-section of a sliding member according to an embodiment of the present invention.
Figure 1:
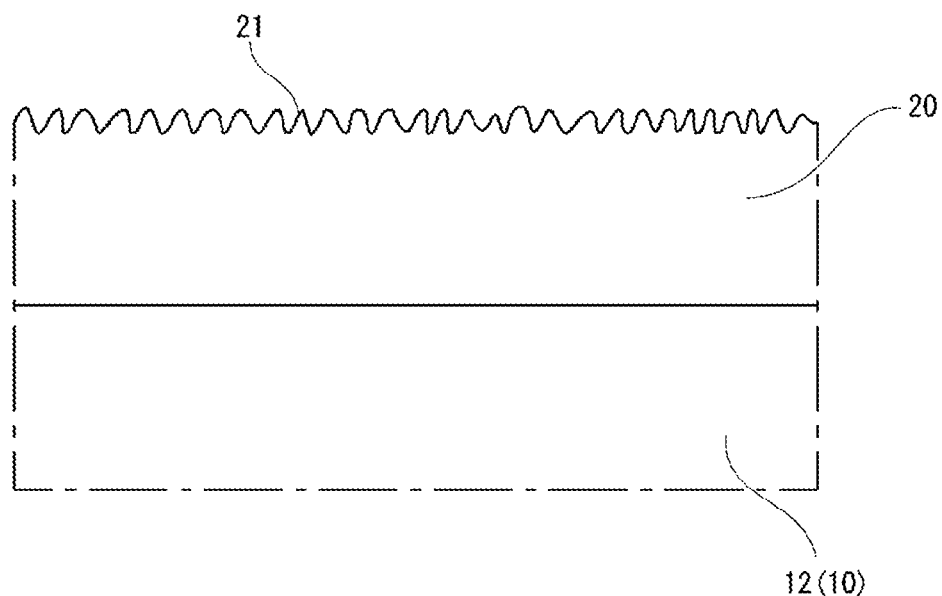

The vertical direction in FIG. 1 corresponds to the thickness direction of each of the layers. The base material layer 10 includes a steel plate layer 11, and an alloy layer 12 made of an alloy of aluminum (Al), copper (Cu), tin (Sn), etc. is provided on the surface (sliding surface 21-side surface) of the steel plate layer 11.

The resin composition constituting the resin layer 20 contains a resin binder and a solid lubricant. The resin binder in the resin composition allows the resin layer 20 to bind to the base material layer 10, and fixes the solid lubricant. A resin material used for the resin binder can appropriately be selected depending on, for example, the intended use of the sliding member 1. When the sliding member 1 is applied to the internal-combustion engine of an automobile or the like, the resin material may be at least one of a polyimide resin, a polyamide-imide resin, an epoxy resin, a phenol resin, a polyamide resin, a fluorine resin, and an elastomer, and may also be a polymer alloy.

The thickness of the resin layer 20 can freely be set, and may be, for example, 1 μm or more but 20 μm or less. Examples of a method for laminating the resin layer 20 include pad printing, screen printing, spray coating (air spraying, airless spraying), electrostatic coating, tumbling, squeezing, rolling, and roll coating. A particularly preferred method used to carry out the present invention will be described later.

The type of the solid lubricant can appropriately be selected depending on the intended use of the sliding member 1. For example, the solid lubricant may be at least one selected from graphite, h-boron nitride (h-BN), molybdenum trioxide, molybdenum disulfide, tungsten disulfide, polytetrafluoroethylene (PTFE), melamine cyanurate, carbon fluoride, phthalocyanine, graphene nanoplatelets, fullerene, ultrahigh molecular weight polyethylene (manufactured by Mitsui Chemicals, Inc. under the trade name of "MIPELON"), and NE-lauroyl-L-lysine (manufactured by Ajinomoto Co., Inc. under the trade name of "AMIHOPE"). Particularly preferred type and compounding amount of the solid lubricant to carry out the present invention will be described later.

FIG. 1(B) is an enlarged sectional view of an area enclosed by a dashed-dotted line 1B in FIG. 1(A), that is, an area near the sliding surface 21 of the resin layer 20. As shown in FIG. 1(B), micro irregularities have been formed on the sliding surface 21 being the surface of the resin layer 20 of the sliding member 1. In the sliding member 1 according to this embodiment, the shape of micro irregularities of this sliding surface 21 is controlled to achieve the oleophobicity or oleophilicity (i.e., wettability with a lubricant oil) of the sliding surface 21 suitable to prevent wear or seizure of the sliding member 1 and a counterpart sliding member thereof. More specifically, the surface roughness of the sliding surface 21 of the resin layer 20, the mean spacing (s) between local peaks on the sliding surface 21, and the mean height (Rc) of the sliding surface 21 are controlled. They will be described below.

(Surface Roughness of Sliding Surface 21)

The surface roughness is generally called also surface area ratio, and is represented as the ratio of a surface area generated by the surface shape of a sample relative to the area of a specified region (surface area/area). In this embodiment, the sliding surface 21 of the resin layer 20 is formed so as to have a surface roughness of 1.05 or more, preferably 1.07 or more. The upper limit of the surface roughness may be, for example, 1.1. If the surface roughness exceeds 1.1, there is a possibility that an oil film cannot have a sufficient thickness.

As will be described later with reference to examples and a comparative example, a test performed by the present inventors has revealed that when the surface roughness of the sliding surface 21 of the resin layer 20 is 1.05 or more, particularly 1.07 or more, wettability of the sliding surface 21 with a lubricant oil is improved. This is considered to be based on the Wenzel formula represented as the following formula 1.

$$\cos \phi = \frac{r\,(\gamma\, SG - \gamma\, SL)}{\gamma LG} = r \cos \theta \qquad \text{[Formula 1]}$$

In the above formula 1, the meanings of symbols are as follows.
r: Surface roughness
Φ: Contact angle on rough surface
θ: Contact angle on smooth surface
γLG: Surface tension exerted on interface between liquid and gas
γSL: Surface tension exerted on interface between solid and liquid
γSG: Surface tension exerted on interface between solid and gas According to the above formula 1, when θ<90°, Φ<θ. Therefore, it can be seen that a wettable surface becomes more wettable by surface roughening. That is, it can be seen that the wettability of the sliding surface 21 improves as the surface roughness of the wettable sliding surface 21 increases so that a lubricant oil easily wets and spreads over the entire sliding surface 21.

Figure 2:
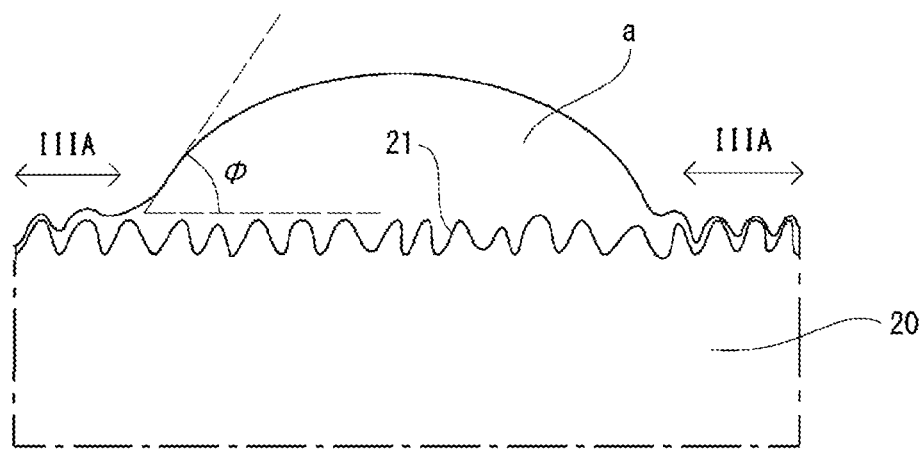
FIG. 2(A) is a schematic view showing a wetting state of a sliding surface of the sliding member according to the embodiment with a lubricant oil.
FIG. 2(B) is a schematic view showing a wetting state of a sliding surface of a sliding member of a comparative example with a lubricant oil.
Figure 2:
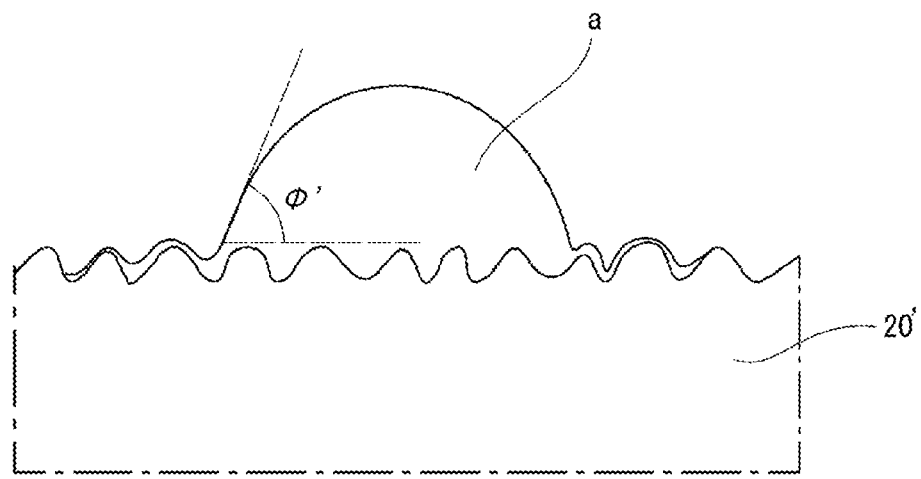

FIG. 2(A) is a schematic sectional view showing a state of wetting of the sliding surface 21 of this embodiment with a lubricant oil a, and FIG. 2(B) is a schematic sectional view showing a state of wetting of a sliding surface of a resin layer 20' of a sliding member of a comparative example with a lubricant oil a. The sliding surface 21 shown in FIG. 2(A) has a surface roughness of 1.05 or more, and the sliding surface shown in FIG. 2(B) has a surface roughness of less than 1.05. The contact angle Φ of a lubricant oil drop on the sliding surface 21 shown in FIG. 2(A) is smaller than the contact angle Φ' of a lubricant oil drop on the sliding surface shown in FIG. 2(B), and therefore the wettability of the sliding surface 21 shown in FIG. 2(A) improves as compared with the wettability of the sliding surface shown in FIG. 2(B) so that the lubricant oil a more easily wets and spreads on the sliding surface 21.

(Mean Spacing (s) Between Local Peaks of Sliding Surface 21)

Figure 3:
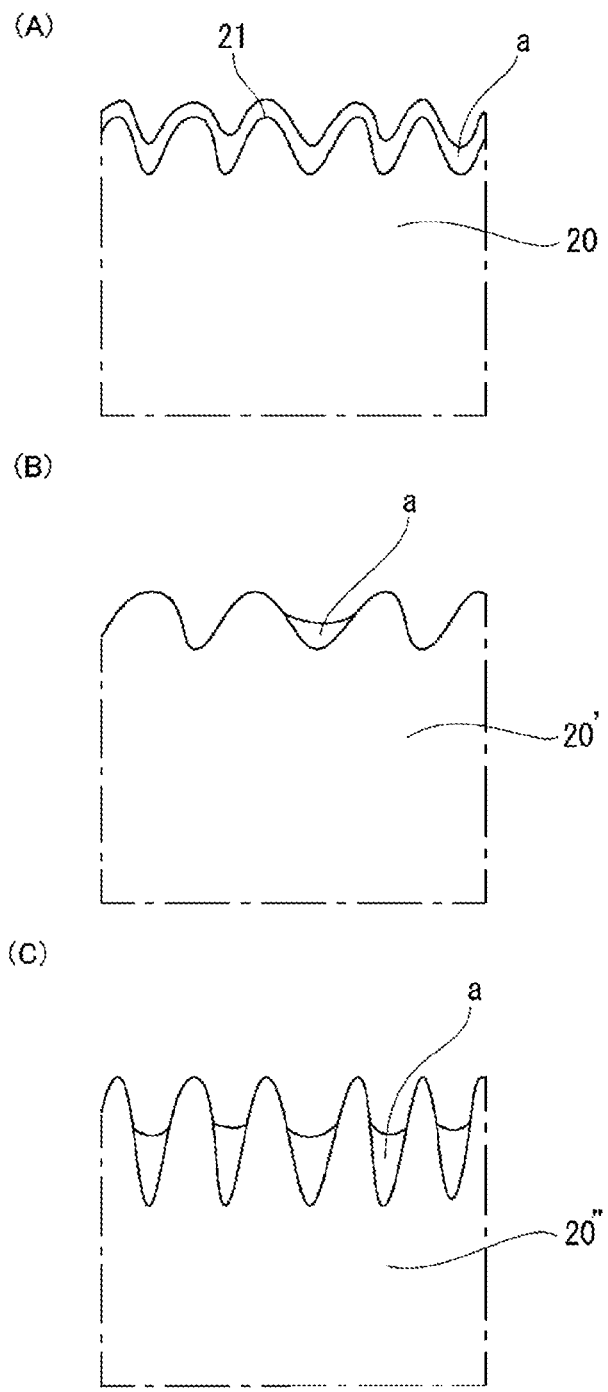
FIG. 3(A) is a schematic view showing a state of wet-spreading of a lubricant oil on the sliding surface of the sliding member according to the embodiment.
FIGS. 3(B) and 3(C) are schematic views each showing a state of wet-spreading of a lubricant oil on a sliding surface of a sliding member of a comparative example.

According to JIS B0601 1994, the mean spacing (s) between local peaks is defined as the arithmetic mean of many spacings between local peaks determined as lengths in the mean line corresponding to the spacings between adjacent local peaks in a roughness profile extracted so as to have a sampling length (L) only. In the sliding member 1 according to this embodiment, the sliding surface 21 of the resin layer 20 is formed in such a manner that the mean spacing (s) between local peaks of the sliding surface 21 is in the range of 2 μm or more but 12 μm or less, preferably in the range of 2 μm or more but 10 μm or less. The cross-section of such a sliding surface 21 whose mean spacing (s) between local peaks is in the range of 2 μm or more but 12 μm or less, preferably in the range of 2 μm or more but 10 μm or less is schematically shown in FIG. 3(A). In this case, wet-spreading of the lubricant oil a appropriately and continuously occurs on the sliding surface 21. In FIG. 2(A), a double-headed arrow IIIA indicates the area where wet-spreading of the lubricant oil a occurs. Such wet-spreading of the lubricant oil a is considered to be caused by capillary action. When the mean spacing (s) between local peaks of the sliding surface 21 is 12 μm or less, wet-spreading of the lubricant oil a is easily caused by capillary action in valleys between local peaks. Such an effect becomes more remarkable when the spacing between local peaks is narrower.

On the other hand, when the spacing between local peaks is large as in the case of the sliding surface of the resin layer 20' of the comparative example shown in FIG. 3(B), the lubricant oil a stays in valleys between local peaks, and therefore wet-spreading of the lubricant oil a does not effectively occur.

(Mean Height (Rc))

According to JIS B0601 2001, the mean height (Rc) is defined as the mean of heights of profile elements within a sampling length. The sliding surface 21 of the resin layer 20 of this embodiment is formed in such a manner that the mean height (Rc) is in the range of 0.5 μm or more but 5.0 μm or less, preferably in the range of 0.5 μm or more but 3.0 μm or less. In the sliding surface 21 shown in FIG. 3(A), the mean height (Rc) is in the range of 0.5 μm or more but 5.0 μm or less, preferably in the range of 0.5 μm or more but 3.0 μm or less. In this case, wet-spreading of the lubricant oil a appropriately and continuously occurs on the sliding surface 21.

On the other hand, when the mean height (Rc) is large as in the case of the sliding surface of a resin layer 20" of a comparative example shown in FIG. 3(C), valleys between peaks act as oil pockets, and therefore wet-spreading of the lubricant oil a is less likely to occur.

Since the sliding member 1 according to this embodiment is configured in such a manner as described above, a lubricant oil easily spreads over the entire sliding surface 21, which improves seizure resistance.

(Method for Manufacturing Sliding Member 1)

Hereinbelow, as a method for manufacturing the sliding member 1 according to this embodiment, methods for adjusting the surface roughness, the mean spacing (s) between local peaks, and the mean height (Rc) of the sliding surface 21 when the resin layer 20 is formed on the surface of the base material 10 will be described.

(Method for Adjusting Surface Roughness)

Figure 4:
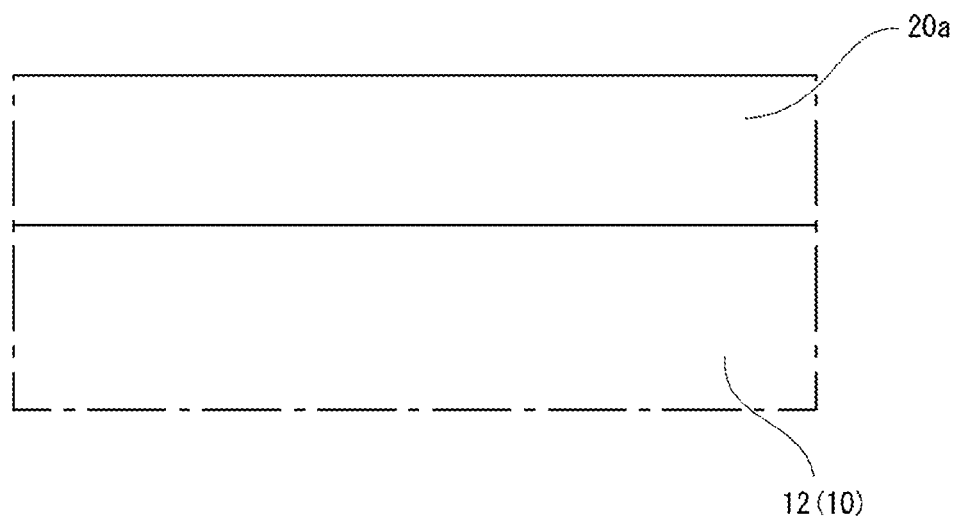
FIG. 4 is an illustration for explaining a method for producing the sliding member according to the embodiment.
Figure 4:
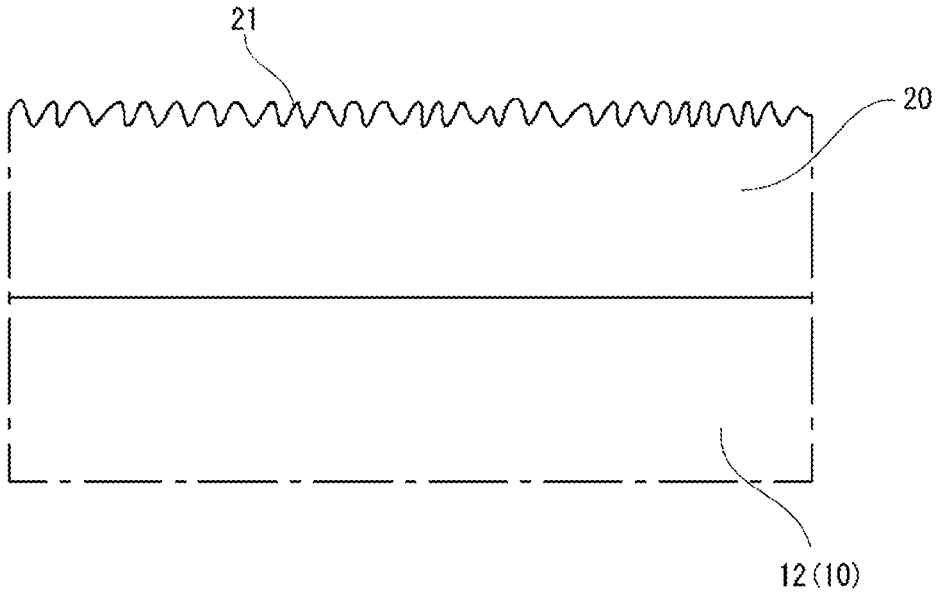

First, as shown in FIG. 4(A), a coating material as a material of the resin layer 20 is applied onto the surface of the base material 10 to have a constant height and a smooth surface irrespective of the surface shape of the base material 10. At this time, a coating method is not particularly limited, and as long as the base material 10 is not deformed, the surface of the coating material as a material of the resin layer 20 may be made smooth by applying a predetermined load thereto after application of the coating material.

Then, as shown in FIG. 4(B), a coating material having a relatively low viscosity is applied by spray coating onto the layer formed as shown in FIG. 4(A). The advantage of using spray coating is that surface roughness is easily controlled because the coating material is applied in an atomized state. When the viscosity of the coating material is reduced, the size of atomized particles of the coating material is reduced, which makes it possible to increase the surface roughness of the outermost surface of the resin layer 20. Further, when the time from application to drying is increased, the coating film follows the surface so that the surface roughness is reduced. Therefore, the surface roughness can be increased by reducing the drying time. As described above, in this embodiment, the surface roughness is adjusted to achieve a desired surface roughness by adjusting the viscosity of a coating material as a material of the resin layer 20, forming the outermost layer of the resin layer 20 by spray coating, and adjusting the time to dry the outermost layer.
(Method for Adjusting Mean Spacing (s) Between Local Peaks)

In this embodiment, the mean spacing (s) between local peaks of the sliding surface 21 is adjusted by adjusting the viscosity of the coating material. The mechanism of the adjustment is basically the same as that of the above-described adjustment of the surface roughness. That is, the size of atomized particles of the coating material is reduced by reducing the viscosity of the coating material as a material of the resin layer 20 so that the mean spacing (s) between local peaks is reduced. On the other hand, the size of atomized particles of the coating material is increased by increasing the viscosity of the coating material as a material of the resin layer 20 so that the mean spacing (s) between local peaks is increased.
(Method for Adjusting Mean Height (Rc))

In this embodiment, the mean height (Rc) of the sliding surface 21 is adjusted by controlling the final coating thickness of the resin layer 20. When the resin layer 20 having a desired film thickness (e.g., 5 μm) is formed by applying the coating material, a lower layer having a film thickness of 4.5 μm is first formed by applying the coating material as shown in FIG. 4(A), and then the outermost layer having a thin film thickness of 0.5 μm or less is formed by applying the coating material as shown in FIG. 4(B). At this time, the mean height of the outermost surface of the resin layer 20 depends on the thickness of the final coating film, and therefore a desired mean height (Rc) can be achieved by controlling the thickness of the final coating film. That is, the mean height (Rc) is reduced by reducing the thickness of the final coating film when the resin layer 20 is formed, and is increased by increasing the thickness of the final coating film when the resin layer 20 is formed. In addition, when the sliding member 1 is a cylindrical slide bearing or the like, and the sliding surface 21 is formed on the inner peripheral side thereof, centrifugal force is applied thereto before the coating film is dried so that the coating film is pulled in the circumferential direction by the force. Therefore, the peaks become lower so that the mean height (Rc) is reduced. The mean height (Rc) is adjusted by appropriately using these methods in combination.
(Material of Resin Layer 20)

The resin layer 20 of this embodiment contains, as solid lubricants, a first solid lubricant excellent in heat resistance and a second solid lubricant excellent in lubricity. More specifically, the first solid lubricant contained in the resin layer 20 has heat resistance higher than that of the second solid lubricant, and the second solid lubricant has lubricity higher than that of the first solid lubricant. The second solid lubricant may contain, for example, at least one of molybdenum disulfide ($MoS_2$), tungsten disulfide ($WS_2$), and polytetrafluoroethylene (PTFB). The volume ratio of the first solid lubricant to the second solid lubricant contained in the resin layer 20 is adjusted to fall within the range of 0.1 or more but 4.0 or less, preferably within the range of 0.5 or more but 2.6 or less. The first solid lubricant may contain, for example, at least one of graphite (Gr), h-boron nitride (h-BN), and molybdenum trioxide ($MoO_3$).

As described above, the resin layer 20 of this embodiment contains the first solid lubricant excellent in heat resistance, and is therefore excellent in sliding properties in a high-temperature environment. Therefore, even when a high-temperature environment is created by heat generated by the contact between the sliding member 1 and a counterpart sliding member thereof, wear resistance and anti-seizure properties are improved due to excellent sliding properties.

Further, the resin layer 20 contains the second solid lubricant particularly excellent in lubricity, such as molybdenum disulfide, tungsten disulfide, or polytetrafluoroethylene, and is therefore excellent in sliding properties so that an increase in the temperature of the sliding surface is prevented. Therefore, wear resistance and seizure resistance are improved.

Further, the volume ratio of the first solid lubricant to the second solid lubricant contained in the resin layer 20 is adjusted to fall within the range of 0.1 or more but 4.0 or less, preferably within the range of 0.5 or more but 2.6 or less so that seizure resistance is improved. This is because the resin layer 20 is excellent in sliding properties in a high-temperature environment due to the action of the first solid lubricant, and an increase in the temperature of the sliding surface is prevented by the second solid lubricant.

EXAMPLES

In order to examine the effects of the present invention, a seizure test was performed under the following test conditions. This test is intended to evaluate the seizure resistance of a sample in the following manner. A slide bearing and a shaft are prepared as a sliding member 1 and a counterpart sliding member thereof, respectively, and both of them are allowed to slide on each other. When a torque becomes a certain value or more, it is judged that seizure has occurred, and a surface pressure measured at this time is obtained as a test result.
(Test Conditions)

Conditions common in the test are as follows. It is to be noted that the viscosity of a coating material as a material of a resin layer (coating material viscosity (mPa·s)), the temperature at which the coating material is dried to form the resin layer (drying temperature (° C.)), and the final coating film thickness (μm) of the resin layer in each of examples and a comparative example are shown in Table 1. The "vol %" in the columns of the first solid lubricant and the second solid lubricant in Table 1 represents the volume ratio of the first solid lubricant or the second solid lubricant contained in the coating material for forming the resin layer 20 except for volatile components.

Lubricant oil: 5W-30
Rotation speed: 3600 rpm
Oil supply pressure: 0.4 to 0.5 MPa
Shaft material: S45C
(Method for Measuring Surface Roughness)

In order to measure the surface roughness of the sliding surface of the bearing, the surface condition was measured with a laser microscope (VK-X200 manufactured by Keyence Corporation) in a viewing field of 700 μm×500 μm and analyzed by the accompanying analysis application (VK-H1XA). The surface roughness (surface area ratio) was calculated by volume and area measurement performed by the analysis application. In order to eliminate the influence of shape of the bearing, height smoothing has been performed in analysis.
(Method for Measuring Mean Spacing (s) Between Local Peaks and Mean Height (Rc))

The mean spacing (s) between local peaks and the mean height (Rc) of the sliding surface were measured by performing measurement and analysis using the above-described laser microscope and application.

The results of the test performed by the above-described measuring method under the above-described conditions are shown in Table 1 as the results of Examples 1 to 19 and Comparative Example.

TABLE 1

| Example No./Comparative Example | First solid lubricant Type | vol % | Second solid lubricant Type | vol % | Roughness | Mean spacing (s): μm | Mean height (Rc): μm | Ratio between lubricants (first/second) | Test result (MPa) | Coating material viscosity (mPa·s) | Drying temperature °C | Final coating film thickness (μm) |
|---|---|---|---|---|---|---|---|---|---|---|---|---|
| Example 1 | Gr | 40 | — | 0 | 1.05 | 15 | 5.2 | — | 50.0 | 80 | 95 | 5.4 |
| Example 2 | Gr | 40 | — | 0 | 1.07 | 14 | 5.2 | — | 52.5 | 75 | 100 | 5.4 |
| Example 3 | Gr | 40 | — | 0 | 1.1 | 14 | 5.2 | — | 52.5 | 75 | 120 | 5.4 |
| Example 4 | Gr | 40 | — | 0 | 1.05 | 12 | 5.0 | — | 60.0 | 70 | 90 | 5.2 |
| Example 5 | Gr | 40 | — | 0 | 1.06 | 2 | 5.0 | — | 60.0 | 30 | 110 | 5.2 |
| Example 6 | Gr | 40 | — | 0 | 1.05 | 12 | 0.5 | — | 60.0 | 70 | 90 | 0.7 |
| Example 7 | Gr | 40 | — | 0 | 1.06 | 2 | 0.5 | — | 62.5 | 30 | 80 | 0.7 |
| Example 8 | Gr | 40 | — | 0 | 1.06 | 8 | 3.0 | — | 62.5 | 60 | 90 | 3.2 |
| Example 9 | Gr | 4 | $MoS_2$ | 36 | 1.06 | 7 | 2.8 | 0.1 | 70.0 | 60 | 90 | 3.0 |
| Example 10 | Gr | 28 | $MoS_2$ | 12 | 1.06 | 7 | 2.8 | 2.3 | 72.5 | 60 | 90 | 3.0 |
| Example 11 | Gr | 32 | $MoS_2$ | 8 | 1.06 | 7 | 2.8 | 4.0 | 70.0 | 60 | 90 | 3.0 |
| Example 12 | Gr | 13 | $MoS_2$ | 27 | 1.06 | 7 | 2.8 | 0.5 | 72.5 | 60 | 90 | 3.0 |
| Example 13 | Gr | 29 | $MoS_2$ | 11 | 1.06 | 7 | 2.8 | 2.6 | 72.5 | 60 | 90 | 3.0 |
| Example 14 | Gr | 14 | $MoS_2$ | 6 | 1.06 | 7 | 2.8 | 2.3 | 72.5 | 60 | 90 | 3.0 |
| Example 15 | Gr | 42 | $MoS_2$ | 18 | 1.06 | 7 | 2.8 | 2.3 | 72.5 | 60 | 90 | 3.0 |
| Example 16 | hBN | 28 | $MoS_2$ | 12 | 1.06 | 7 | 2.8 | 2.3 | 72.5 | 60 | 90 | 3.0 |
| Example 17 | $MoO_3$ | 28 | $MoS_2$ | 12 | 1.06 | 7 | 2.8 | 2.3 | 72.5 | 60 | 90 | 3.0 |
| Example 18 | Gr | 28 | $WS_2$ | 12 | 1.06 | 7 | 2.8 | 2.3 | 72.5 | 60 | 90 | 3.0 |
| Example 19 | Gr | 28 | PTFE | 12 | 1.06 | 7 | 2.8 | 2.3 | 72.5 | 60 | 90 | 3.0 |
| Comparative Example | Gr | 40 | — | 0 | 1.03 | 15 | 5.2 | — | 30.0 | 80 | 60 | 5.4 |

Effects obtained by satisfying the following conditions I-1 to IV-2 are examined by focusing on whether or not each of Examples or Comparative Example satisfies these conditions.

Condition I-1: The surface roughness of the sliding surface is 1.05 or more.

Condition I-2: The surface roughness of the sliding surface is 1.07 or more.

Condition II-1: The mean spacing (s) between local peaks of the sliding surface is in the range of 2 μm or more but 12 μm or less.

Condition II-2: The mean spacing (s) between local peaks of the sliding surface is in the range of 2 μm or more but 10 μm or less.

Conditions III-1: The mean height (Rc) of the sliding surface is in the range of 0.5 μm or more but 5.0 μm or less.

Conditions III-2: The mean height (Rc) of the sliding surface is in the range of 0.5 μm or more but 3.0 μm or less.

Condition IV-1: The volume ratio of the first solid lubricant to the second solid lubricant is in the range of 0.1 or more but 4.0 or less.

Conditions IV-2: The volume ratio of the first solid lubricant to the second solid lubricant is in the range of 0.5 or more but 2.6 or less.

When Comparative Example satisfying none of the conditions I-1 to IV-2 and Example 1 satisfying the condition I-1 were compared, the surface pressure at the occurrence of seizure (test result) of Comparative Example was 30 MPa, whereas the surface pressure at the occurrence of seizure of Example 1 was 50 MPa. That is, the satisfaction of the condition I-1 was effective at improving seizure resistance, that is, improving sliding properties.

When Example 1 and Examples 2 and 3 satisfying the condition 1-2 were compared, the surface pressure at the occurrence of seizure of Example 2 or 3 was 52.5 MPa, that is, seizure resistance was further improved.

The surface pressure at the occurrence of seizure of Example 4 satisfying the conditions I-1, II-1, and III-1 was 60 MPa. That is, seizure resistance was improved as compared with when only the condition I-1 or 1-2 was satisfied (Examples 1 to 3).

When the condition II-1 of Example 4 was changed to the condition 11-2 (Example 5) and the condition III-1 of Example 4 was changed to the condition 111-2 (Example 6), seizure resistance was not further improved. However, when both the condition 11-2 and the condition 111-2 were satisfied, seizure resistance was further improved (Examples 7 and 8).

The surface pressure at the occurrence of seizure of Example 9 or 11 satisfying the conditions I-1, II-2, III-2, and IV-1, was 70 MPa, that is, seizure resistance was further improved as compared with Examples 7 and 8.

The surface pressure at the occurrence of seizure of each of Examples 10 and 12 to 19 satisfying the conditions I-1, II-2, III-2, and IV-2 was 72.5 MPa, that is, seizure resistance was further improved as compared with Examples 9 and 11.

The present invention is not limited to the description of each of the above aspects, embodiments, and examples. The present invention also includes various modified embodiments readily conceivable by those skilled in the art without departing from the scope of the claims.

REFERENCE SIGNS LIST

1 Sliding member
10 Base material layer
11 Steel plate layer
12 Alloy layer
20 Resin layer
21 Sliding surface
a Lubricant oil

The invention claimed is:

1. A sliding member comprising a resin layer provided on a surface of a base material,
wherein the resin layer has a surface roughness of 1.05 or more,
wherein a mean spacing (s) between local peaks of the resin layer is in a range of 2 μm or more and 12 μm or less, and a mean height (Rc) of the resin layer is in a range of 0.5 μm or more and 5.0 μm or less, wherein the surface roughness is a ratio of a surface area of the resin layer in a specified region to an area of the specified region, and wherein the mean height (Rc) is a mean of heights of profile elements of the resin layer in a sampling length.

2. The sliding member according to claim 1, wherein the surface roughness is 1.07 or more.

3. The sliding member according to claim 1, wherein the mean spacing (s) between local peaks of the resin layer is in a range of 2 μm or more and 10 μm or less, and the mean height (Rc) of the resin layer is in a range of 0.5 μm or more and 3.0 μm or less.

4. A sliding member comprising: a resin layer provided on a surface of a base material, wherein the resin layer has a surface roughness of 1.05 or more, wherein a mean spacing (s) between local peaks of the resin layer is in a range of 2 μm or more and 12 μm or less, and a mean height (Rc) of the resin layer is in a range of 0.5 μm or more and 5.0 μm or less, wherein the resin layer contains a high heat-resistant first solid lubricant and a high lubricative second solid lubricant, and a volume ratio of the first solid lubricant to the second solid lubricant is in a range of 0.1 or more and 4.0 or less, wherein the surface roughness is a ratio of a surface area of the resin layer in a specified region to an area of the specified region, and wherein the mean height (Rc) is a mean of heights of profile elements of the resin layer in a sampling length.

5. The sliding member according to claim 4, wherein the volume ratio of the first solid lubricant to the second solid lubricant is in a range of 0.5 or more and 2.6 or less.

6. The sliding member according to claim 4, wherein the second solid lubricant contains at least one of molybdenum disulfide, tungsten disulfide, or polytetrafluoroethylene.

7. The sliding member according to claim 4, wherein the first solid lubricant contains at least one of graphite, h-boron nitride, or molybdenum trioxide.

8. The sliding member according to claim 1, wherein the area of the specified region is 700 μm×500 μm.

9. The sliding member according to claim 4, wherein the area of the specified region is 700 μm×500 μm.

* * * * *